United States Patent

Matsushita et al.

[11] Patent Number: 5,503,232
[45] Date of Patent: Apr. 2, 1996

[54] STEERING SYSTEM FOR A BULLDOZER

[75] Inventors: Shigenori Matsushita; Shigeru Yamamoto; Shu H. Zhang, all of Osaka, Japan

[73] Assignee: Kabushiki Kaisha Komatsu Seisakusho, Tokyo, Japan

[21] Appl. No.: 306,409

[22] Filed: Sep. 15, 1994

[30] Foreign Application Priority Data

Sep. 17, 1993 [JP] Japan ................................ 5-231638

[51] Int. Cl.[6] ............................. B62D 11/08; F16D 67/04
[52] U.S. Cl. .............................. 172/2; 172/7; 364/424.07; 180/6.2
[58] Field of Search ................................ 172/2, 3, 4, 4.5, 172/7; 180/6.48, 6.5, 6.2, 6.7, 9.5, 119, 127, 333; 414/699, 912; 37/348, 382; 364/424.07

[56] References Cited

U.S. PATENT DOCUMENTS

| | | |
|---|---|---|
| 4,116,291 | 9/1978 | Brungart . |
| 4,479,563 | 10/1984 | Horsch . |
| 4,702,358 | 10/1987 | Mueller et al. . |
| 4,947,948 | 8/1990 | Dückinghaus ........................... 180/6.7 |
| 5,101,919 | 4/1992 | Ossi ..................................... 180/6.7 X |
| 5,325,933 | 7/1994 | Matsushita ............................. 180/6.7 |

*Primary Examiner*—Terry Lee Melius
*Assistant Examiner*—Robert Pezzuto
*Attorney, Agent, or Firm*—Armstrong, Westerman, Hattori, McLeland & Naughton

[57] ABSTRACT

A steering system for a bulldozer, comprising a steering direction indicating device for indicating a lateral direction in which a vehicle body is to be steered, a dozing operation detector for judging by detection whether the bulldozer is in dozing operation, a steering controller for controlling the vehicle body to be steered in the lateral direction indicated by the steering direction indicating device when the dozing operation detector judges that the bulldozer is in dozing operation, by tilting a blade in the indicated lateral direction in order to impose offset load on the vehicle body, and by causing a difference between the relative travel speeds of right and left crawler belts attached to the vehicle body at least when light load occurs in the dozing operation.

15 Claims, 9 Drawing Sheets

STEERING CONTROL CHARACTERISTIC FOR RUNNING STATE AND FOR DOZING WITH LIGHT LOAD

BLADE TILTING CONTROL CHARACTERISTIC FOR DOZING WITH LIGHT LOAD

BLADE TILTING CONTROL CHARACTERISTIC FOR DOZING WITH HEAVY LOAD

PITCH ANGLE - LOAD CORRECTION VALUE CHARACTERISTIC LINE

STEERING SYSTEM FOR A BULLDOZER

BACKGROUND OF THE INVENTION

(1) Field of the Invention

The present invention relates generally to a system for steering a bulldozer. More particularly, it pertains to a steering control technique for a bulldozer during dozing operation.

(2) Description of the Prior Art

Previously, steering control of a bulldozer during its dozing operation was performed in the following way: During dozing operation in which light load occurs, steering control is carried out by the operation of a steering direction indicating means such as a steering lever. More specifically, steering control is performed by operating the steering direction indicating means such that a difference is caused between the relative travel speeds of the fight and left crawler belts attached to the vehicle body. During dozing operation in which heavy load occurs, steering control is carried out by the operation of a blade tilt indicating means such as a blade control lever. More specifically, work such as digging is carried out with the blade being tilted laterally by the blade tilt indicating means and this allows offset load to be imposed on the vehicle body, whereby steering control is performed.

SUMMARY OF THE INVENTION

In bulldozers employing the above conventional control method, a conventional steering direction indicating means is used for steering control during dozing operation in which light load occurs, while a conventional blade tilt indicating means is used during dozing operation in which heavy load occurs. Therefore, it is necessary for the operator to decide and distinguish between the use of the steering direction indicating means and the use of the blade tilt indicating means in accordance with the load that occurs during dozing operation. This makes the operation of the bulldozer complicated and troublesome.

With such a drawback in view, the present invention has been made and therefore one of the objects of the invention is to provide a steering system for a bulldozer which is capable of performing simplified steering control with ease throughout dozing operation.

In accomplishing this and other objects, there has been provided in accordance with the present invention, a steering system for a bulldozer, comprising:

(a) steering direction indicating means for indicating a lateral direction in which a vehicle body is to be steered;

(b) dozing operation detecting means for judging by detection whether the bulldozer is in dozing operation; and (c) steering controlling means for controlling the vehicle body to be steered in the lateral direction indicated by the steering direction indicating means when the dozing operation detecting means judges that the bulldozer is in dozing operation, by tilting a blade in the indicated lateral direction in order to impose offset load on the vehicle body, and by causing a difference between the relative travel speeds of right and left crawler belts attached to the vehicle body at least when light load occurs in the dozing operation.

According to the above steering system, when the dozing operation detecting means does not judge that the bulldozer is in dozing operation, for example, during running of the bulldozer, the steering controlling means causes a difference between the relative travel speeds of the right and left crawler belts attached to the vehicle body, according to the lateral direction indicated by the steering direction indicating means, so that the vehicle body is steered in the lateral direction indicated.

On the other hand, when the dozing operation detecting means judges that the bulldozer is in dozing operation, the steering controlling means tilts the blade laterally according to the lateral direction indicated by the steering direction indicating means in order that work (e.g., digging) with the tilted blade imposes offset load on the vehicle body. At least when the load occurring in the dozing operation is light, the vehicle body is steered in the indicated lateral direction, by the offset load as well as the relative speed difference that is caused, as is the case for the running state, between the right and left crawler belts of the vehicle body.

With such an arrangement, it is possible to steer the vehicle body in a desired lateral direction by operating only the steering direction indicating means such as a steering lever, regardless of whether heavy load or light load occurs during dozing operation. This ensures simplified and easy steering control throughout dozing operation.

Furthermore, during dozing operation in which light load occurs, the vehicle body is steered in the indicated lateral direction by causing a difference between the relative travel speeds of the right and left crawler belts of the vehicle body as well as by tilting the blade laterally in order that work (e.g., digging) with the tilted blade imposes offset load on the vehicle body. Thus, a load causing a difference between the relative travel speeds of the right and left crawler belts of the vehicle body can be reduced and smooth steering control can be enabled.

The dozing operation detecting means also identifies, in its operation, whether the load occurring in the dozing operation is heavy. It is preferable that, if the dozing operation detecting means judges that heavy load occurs in the dozing operation, the steering controlling means controls the vehicle body to be steered in the lateral direction indicated by the steering direction indicating means, only by tilting the blade laterally according to the indicated lateral direction in order to apply offset load to the vehicle body.

The judgment by the dozing operation detecting means as to whether the bulldozer is in dozing operation and whether heavy load occurs in the dozing operation is preferably performed based on the actual tractive force of the vehicle body. Concretely, when the actual tractive force of the vehicle body is not less than a first specified value, it is judged that the bulldozer is in dozing operation. When the actual tractive force is not less than a second specified value which is greater than the first specified value (e.g., the first specified value =0.3 W and the second specified value =0.5 W), it is judged that heavy load occurs in the dozing operation.

In the dozing operation detecting means, the actual tractive force is obtained in either of the following ways:

1. The dozing operation detecting means is equipped with an engine revolution sensor for detecting the revolution speed of the engine and a torque convertor output shaft revolution sensor for detecting the revolution speed of the output shaft of the torque convertor. A speed ratio e (=Nt/Ne), which is the ratio of the revolution speed Nt of the output shaft of the torque convertor detected by the torque convertor output shaft revolution sensor to the revolution speed Ne of the engine detected by the engine revolution sensor, is first obtained. Then, torque convertor output torque is obtained from the torque convertor characteristic of the torque convertor, using the speed ratio e. The torque convertor output torque is basically multiplied by the reduction ratio between the output shaft of the torque convertor and the sprockets for actuating the crawler belts, thereby obtaining the actual tractive force of the vehicle body.

2. In cases where a torque convertor with a lock-up mechanism is locked up or where a direct transmission is used, the dozing operation detecting means is equipped with an engine revolution-sensor for detecting the revolution speed of the engine. Engine torque is first obtained from the engine torque characteristic of the engine, using the revolution speed of the engine detected by the engine revolution sensor. Then, the engine torque is basically multiplied by the reduction ratio between the engine and the sprockets for actuating the crawler belts, thereby obtaining the actual tractive force of the vehicle body.

3. The dozing operation detecting means is equipped with a driving torque sensor for detecting the amount of driving torque for the sprockets for actuating the crawler belts. Based on the amount of driving torque detected by the driving torque sensor, the actual tractive force of the vehicle body is obtained.

4. The dozing operation detecting means is equipped with a bending stress sensor for detecting the amount of bending stress occurring at the trunnions which are joints between the straight frames for supporting the blade and the vehicle body. Based on the amount of bending stress detected by the bending stress sensor, the actual force of the vehicle body is obtained.

The dozing operation detecting means may be provided with a pitch angle sensor for detecting the pitch angle of the vehicle body inclining in forward and backward directions. The actual tractive force may be corrected based on the pitch angle detected by the pitch angle sensor, so that the judgment as to whether the bulldozer is in dozing operation and whether heavy load occurs in the dozing operation can be performed with high accuracy, in spite of running resistance caused by the pitch angle of the vehicle body, i.e., the inclination of the land where the bulldozer runs.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitative of the present invention, and wherein:

FIG. 1 is a view of the external appearance of the bulldozer;

FIG. 2 is a schematic diagram showing the operation of a steering lever;

FIG. 3 is a skeleton diagram of a power transmission system;

FIG. 4 is a block diagram of the overall construction of the steering system;

FIG. 5 is a flow chart of a program;

FIG. 6 is a graph showing an engine characteristic curve;

FIG. 7 is a graph showing a pump correction characteristic curve;

FIG. 8 is a graph showing torque convertor characteristic curves;

FIG. 9 is a graph showing a pitch angle-load correction characteristic line;

FIG. 10 is a graph showing a steering control characteristic line for the running state and for dozing operation in which light load occurs;

FIG. 11 is a graph showing a blade tilting control characteristic curve for dozing operation in which light load occurs; and FIG. 12 is a graph showing a blade tilting control characteristic curve for dozing operation in which heavy load occurs.

PREFERRED EMBODIMENTS OF THE INVENTION

With reference to the drawings, a steering system for a bulldozer according to a preferred embodiment of the invention will be hereinafter described.

Figure 1:
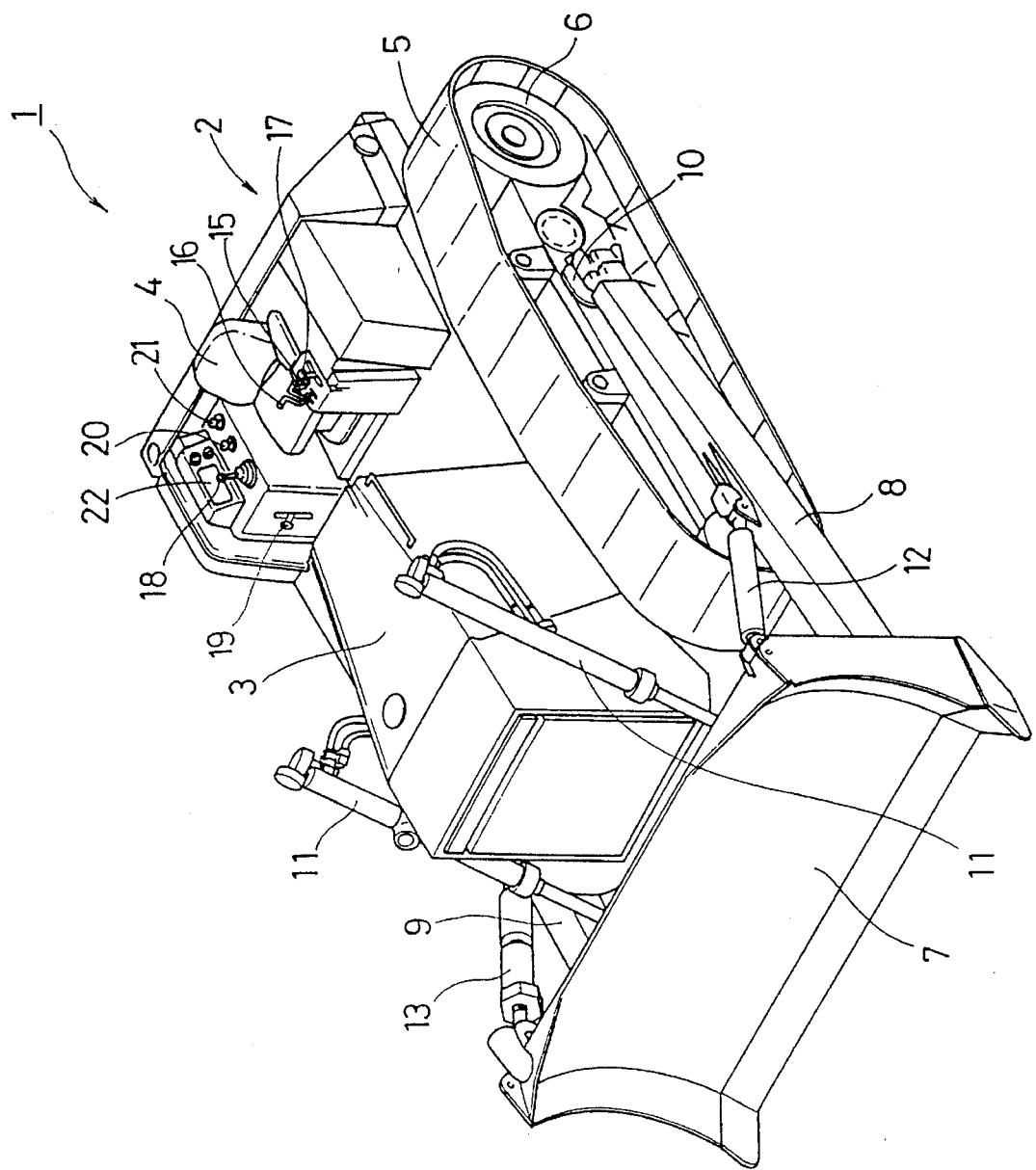
FIGS. 1 to 12 provide illustrations of a steering system for a bulldozer according to a preferred embodiment of the invention.

Referring initially to FIG. 1, there is shown a perspective view of the external appearance of a bulldozer 1. The bulldozer 1 is provided with, on a vehicle body 2 thereof, a bonnet 3 for housing an engine (not shown) and an operator seat 4 for the operator who drives the bulldozer 1. The right and left sides of the vehicle body 2 are provided with crawler belts 5 for turning the vehicle body 2 or driving it back and forth. These crawler belts 5 are independently driven by their respective sprockets 6 actuated by driving force transmitted from the engine. Note that the crawler belt 5 and the sprocket 6 on the right side are not shown in the drawing.

There are provided straight frames 8, 9 for supporting, at the forward ends thereof, a blade 7 located in front of the vehicle body 2. The base ends of these right and left straight frames 8, 9 are pivotally supported on and coupled to the vehicle body 2 by means of trunnions 10 in such a manner that the blade 7 can be lifted or lowered. Note that the trunnion 10 on the right side is not shown.

Disposed between the blade 7 and the vehicle body 2 are right and left blade lift cylinders 11 arranged in a pair for lifting or lowering the blade 7. For tilting the blade 7 to the right and left, there are provided a brace 12 between the blade 7 and the left straight frame 8 and a blade tilt cylinder 13 between the blade 7 and the right straight frame 9.

There are provided a steering lever 15, a gear shift lever 16 and a fuel control lever 17 on the left of the operator seat 4. The steering lever 15 is operated in lateral directions and serves as the steering direction indicating means of the invention. The gear shift lever 16 is operated in forward and backward directions so as to be placed in a forward position, a neutral position or a reverse position, for putting the vehicle body 2 in one of the three speed ranges in forward and backward directions or stopping the vehicle body 2. The fuel control lever 17 is also operated in forward and backward directions. On the right of the operator seat 4, there are provided a blade control lever 18 operated in forward, backward and in lateral directions for lifting and lowering the blade 7 and inclining it to the right and left; a parking brake 19 operated in vertical directions; an automatic steering control mode selector button 20 for switching automatic steering control ON or OFF during dozing operation; a lock-up selector switch 21 for shifting a torque convertor between a locked-up up state and a torque converting state; and a display unit 22. Although they are not shown in the drawing, a decelerator pedal, a gear shift clutch pedal and a steering brake pedal are provided in front of the operator seat 4.

Figure 2:
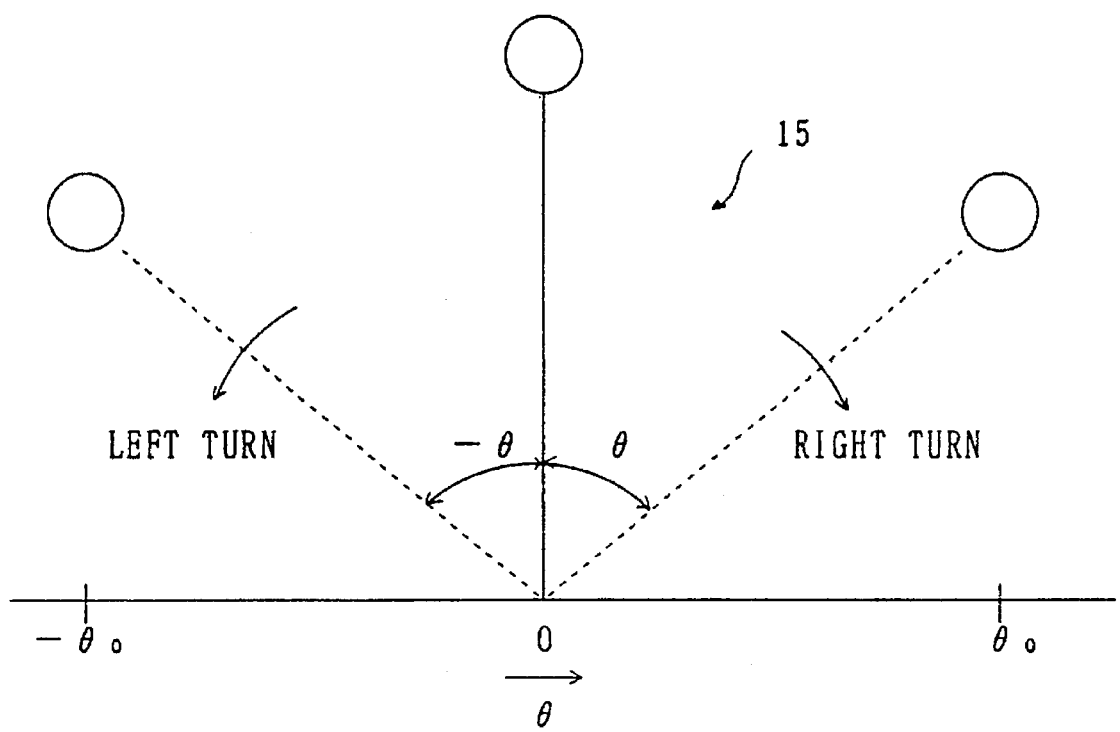

By operating the steering lever 15 in lateral directions, the vehicle body 2 turns to the right or left in accordance with the operating direction of the steering lever 15. The maximum stroke displacement positions of the steering lever 15 are designated by $-\theta_0$ and $\theta_0$ in FIG. 2. As the steering lever 15 is moved laterally from the neutral position 0 to the maximum stroke displacement position $-\theta_0$ or $\theta_0$, the turning radius of the vehicle body 2 when it makes a right or left turn becomes smaller.

Figure 3:
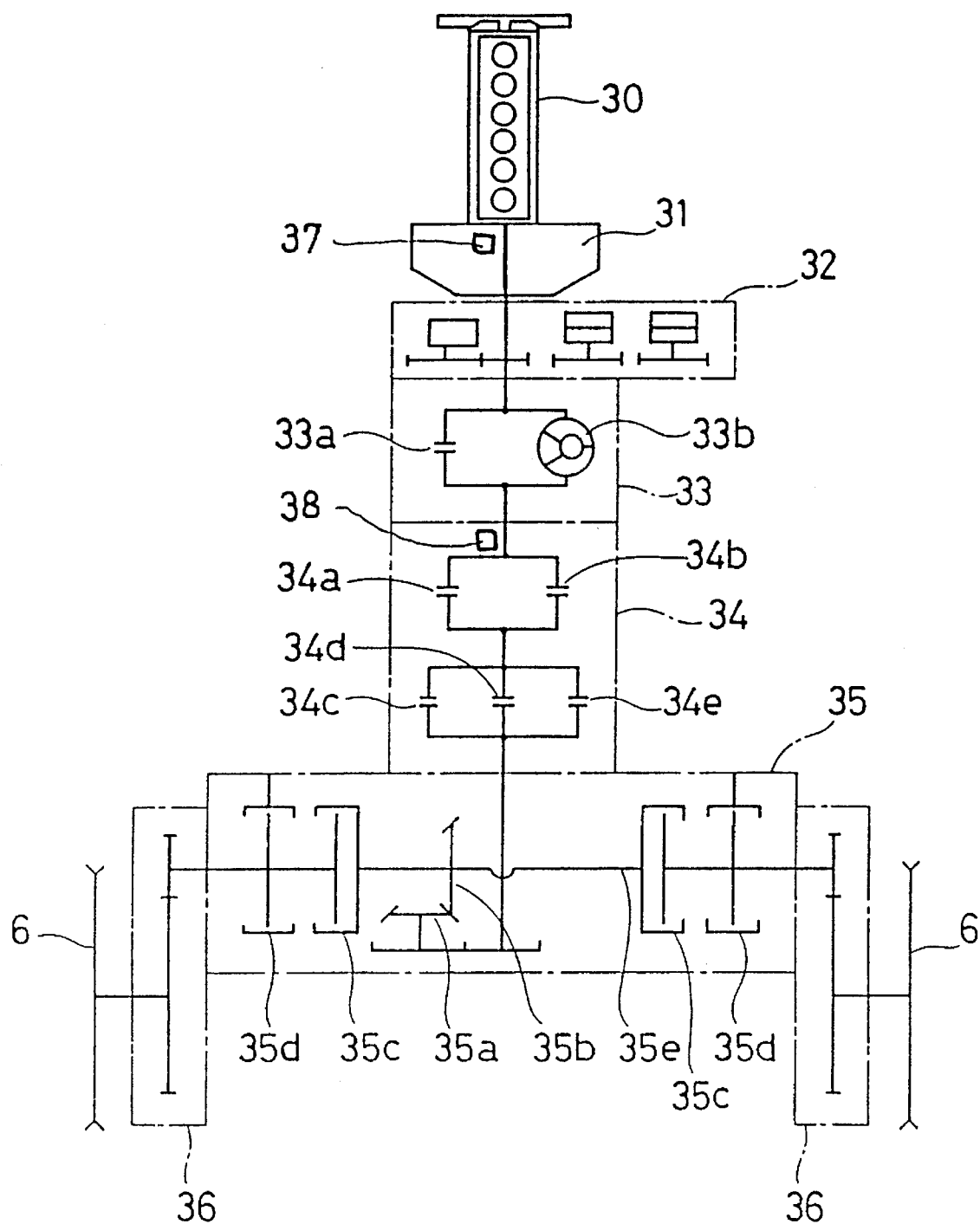

Referring to FIG. 3 which shows a power transmission system, rotary driving force from an engine 30 is transmitted to a damper 31 and a PTO 32 which actuates various hydraulic pumps including hydraulic pumps for operational machines. Then, the rotary driving force is transmitted to a torque convertor with a lock-up mechanism 33 which includes a lock-up clutch 33a and a pump 33b. The rotary driving force is transmitted from the output shaft of the torque convertor with a lock-up mechanism 33 to a transmission 34 whose input shaft is coupled to the output shaft of the torque convertor with a lock-up mechanism 33. The transmission 34 is for example a planetary gear lubricated multiple-disc clutch transmission and includes forward and reverse clutches 34a, 34b and first to third clutches 34c to 34e so that the revolution speed of the output shaft of the transmission 34 can be shifted in three ranges in both forward and backward directions. The rotary driving force from the output shaft of the transmission 34 is transmitted to a steering mechanism 35 which includes a pinion 35a and a transverse shaft 35e on which disposed are a bevel gear 35b, right and left steering clutches 35c arranged in a pair, and right and left steering brakes 35d arranged in a pair. Thereafter, the rotary driving force is transmitted to right and left final reduction mechanisms 36 arranged in a pair so that each of the sprockets 6 for running the crawler belts 5 (not shown in FIG. 3) is driven. Reference numeral 37 denotes an engine revolution sensor for detecting the revolution speed of the engine 30 and reference numeral 38 denotes a torque convertor output shaft revolution sensor for detecting the revolution speed of the output shaft of the torque convertor with a lock-up mechanism 33.

Figure 4:
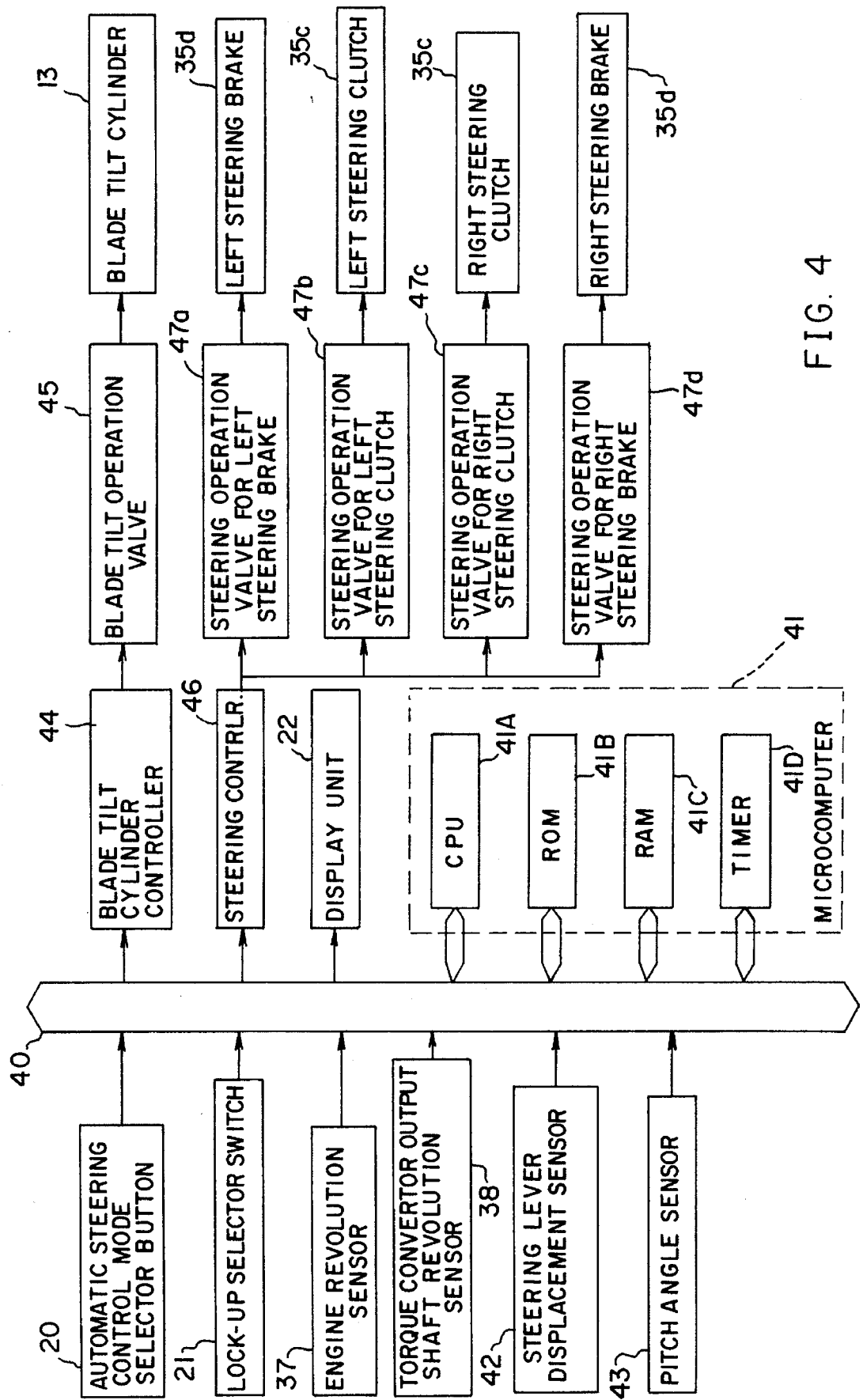

Referring to FIG. 4 which schematically shows the overall construction of the steering system for a bulldozer according to the invention, the following data items are provided over a bus 40 to a microcomputer 41: (i) an automatic/manual steering control mode instruction from the automatic steering control mode selector button 20, regarding whether the automatic steering control for dozing operation has been switched ON or OFF; (ii) a locked-up (LU)/torque converting (TC) state instruction from the lock-up selector switch 21, regarding whether the lock-up mechanism of the torque convertor with a lock-up mechanism 33 has been switched ON or OFF; (iii) revolution speed data from the engine revolution sensor 37, regarding the revolution speed of the engine 30; and (iv) revolution speed data from the torque convertor output shaft revolution sensor 38, regarding the revolution speed of the output shaft of the torque convertor with a lock-up mechanism 33.

The following data items are also provided over the bus 40 to the microcomputer 41: (i) lever displacement data from a steering lever displacement sensor 42 for detecting the lateral displacement of the steering lever 15 which is moved laterally from the neutral position 0; and (ii) pitch angle data from a pitch angle sensor 43 for detecting the momentarily varying pitch angle of the vehicle body 2 which inclines in forward and backward directions.

The microcomputer 41 is composed of a central processing unit (CPU) 41A for executing a specified program; a read only memory (ROM) 41B for storing the above program and various maps such as a curved engine characteristic map and curved torque convertor characteristic map; a random access memory (RAM) 41C serving as a working memory necessary for executing the program and as registers for various data; and a timer 41D for measuring elapsed time for an event in the program. The program is executed in accordance with (i) the automatic/manual steering control mode instruction; (ii) the LU/TC state instruction; (iii) the revolution speed data of the engine 30; (iv) the revolution speed data of the output shaft of the torque convertor with a lock-up mechanism 33; (v) the lever displacement data of the steering lever 15; and (vi) the pitch angle data of the vehicle body 2 inclining in forward and backward directions, so that data on a tilting amount for laterally tilting the blade 7 is obtained. The data on a tilting amount is then supplied to a blade tilt cylinder controller 44 which actuates, in accordance with the data, the blade tilt cylinder 13 with the help of a blade tilt operation valve 45. As a result, the blade 7 is tilted laterally at a desired tilt angle. Data on a steering amount for turning the vehicle body 2 to the right or left is provided to a steering controller 46 which actuates, in accordance with the data, the pair of steering clutches 35c and the pair of steering brakes 35d in the steering mechanism 35 with the help of steering operation valves 47a to 47d. The steering operation valves 47a to 47d correspond to the steering clutches 35c and the steering brakes 35d respectively for controlling them. The actuation of the steering clutches 35c and steering brakes 35d allows the vehicle body 2 to be turned to the right or left with a desired turning radius while the crawler belts 5 traveling with a relative speed difference between them. The display unit 22 displays information such as whether the bulldozer I is presently in the automatic steering control mode or the manual steering control mode for dozing operation.

Figure 5:
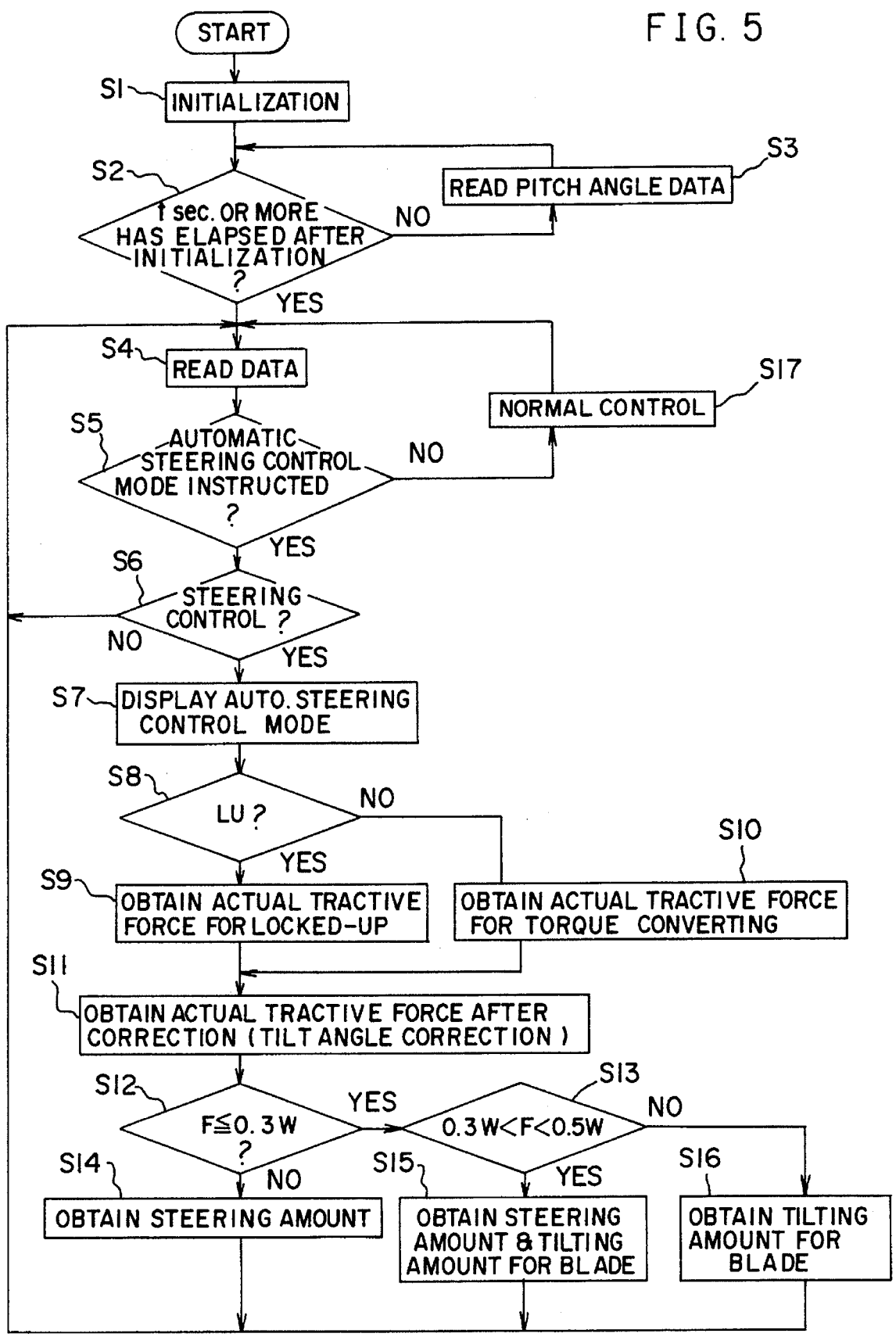

Now reference is made to the flowchart of FIG. 5 for describing the operation of the above-described steering system for a bulldozer.

Step 1 to Step 3: Power is loaded to start execution of the specified program and to execute initialization such as clearing of all the data stored in the registers of the RAM 41C of the microcomputer 41 and resetting of the timer 41D. Serial pitch angle data pieces are read from the pitch angle sensor 43 as initial values over a period of $t_1$ sec. after the initialization. The reasons for reading the serial pitch angle data pieces as initial values is that the pitch angle of the vehicle body 2 is derived from the frequency separation performed on the moving average of the serial pitch angle data pieces.

Step 4: The following data items are firstly read: (i) the automatic/manual steering control mode instruction from the automatic steering control mode selector button 20; (ii) the LU/TC state instruction for the torque convertor with a lock-up mechanism 33 from the lock-up selector switch 21; (iii) the revolution speed data of the engine 30 from the engine revolution sensor 37; (iv) the revolution speed data of the output shaft of the torque convertor with a lock-up mechanism 33 from the torque convertor output shaft revolution sensor 38; (v) the lever displacement data of the steering lever 15 from the steering lever displacement sensor 42; and (vi) the pitch angle data of the vehicle body 2 from the pitch angle sensor 43. A low frequency component is extracted from the frequency separation performed on the moving average of the sequentially read pitch angle data pieces and the pitch angle of the vehicle body 2 is determined from the low frequency component.

Step 5 to Step 11: When the automatic/manual steering control mode instruction from the automatic steering control mode selector button 20 instructs to select the automatic steering control mode for dozing operation, it is judged based on the lever displacement data from the steering lever displacement sensor 42 whether the steering lever 15 has been moved to the right or left from the neutral position 0 so that the vehicle body 2 is being steered. If so, the display unit 22 displays that the bulldozer 1 is in the automatic steering control mode for dozing operation and an actual tractive force $F_R$ is obtained through either of the following processes in accordance with the LU/TC state instruction for the torque convertor with a lock-up mechanism 33.

Figure 6:
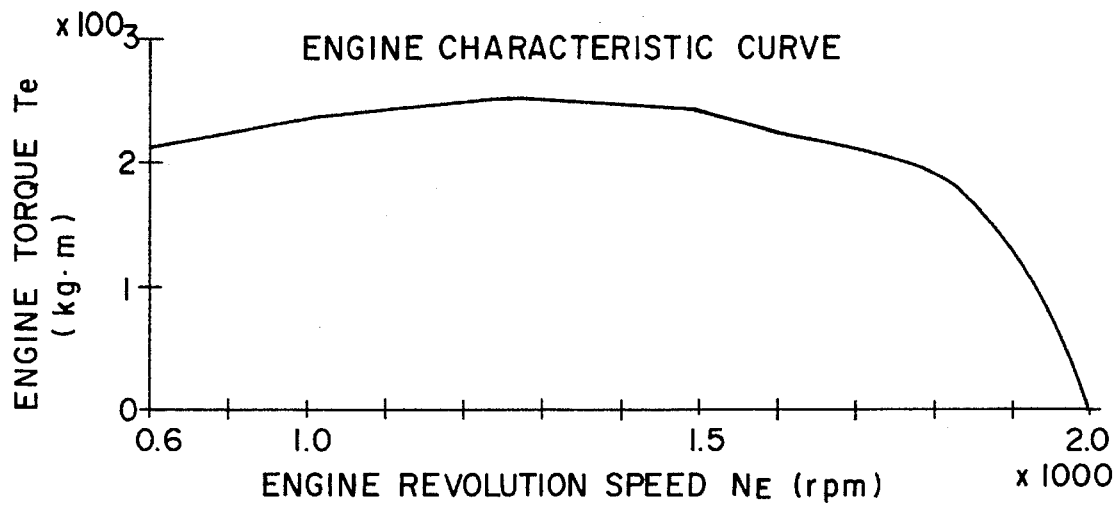
Figure 7:
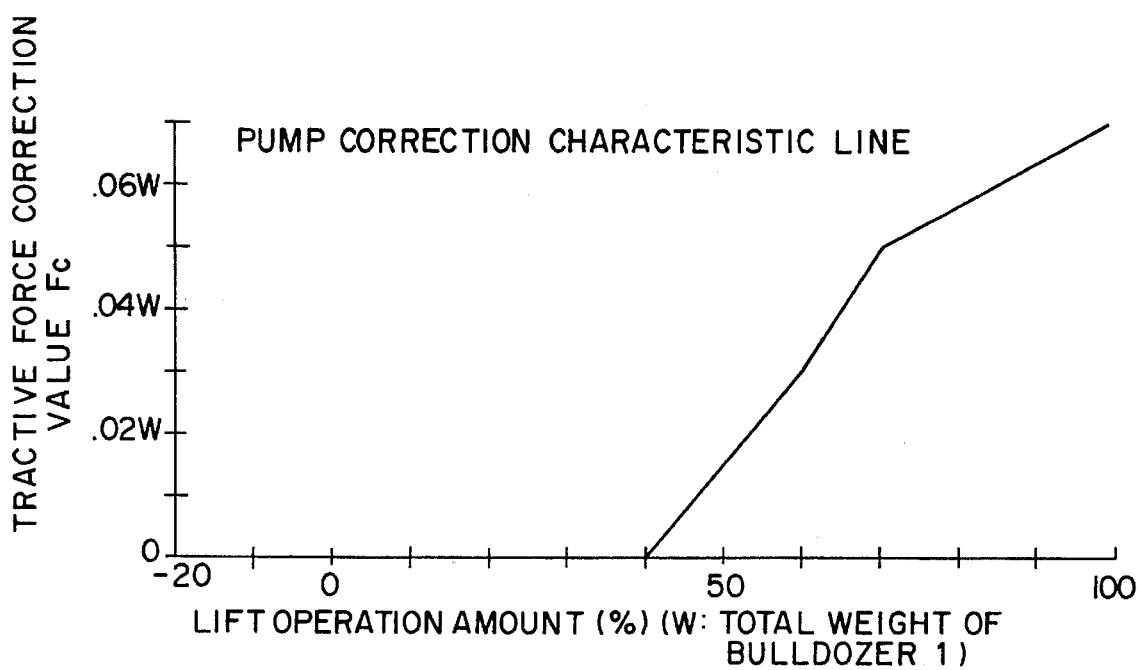

1. Where the torque convertor with a lock-up mechanism 33 is in the locked-up (LU) state:

Engine torque Te is obtained from the curved engine characteristic map as shown in FIG. 6, using the revolution speed Ne of the engine 30. Then, the engine torque Te is multiplied by a reduction ratio $k_{es}$ provided over the range of the transmission 34, the steering mechanism 35 and the final reduction mechanisms 36 (in other words, the reduction ratio between the output shaft of the torque convertor with a lock-up mechanism 33 and the sprockets 6) and further multiplied by the diameter r of the sprocket 6, to obtain a tractive force Fe ($=Te \times k_{es} \times r$). A tractive force correction value Fc is subtracted from the tractive force Fe, thereby obtaining an actual tractive force $F_R(=Fe-Fc)$. The tractive force correction value Fc corresponds to the consumption amount of the hydraulic pumps (e.g., the hydraulic pumps working on the blade lift cylinders 11 in the PTO 32), and can be obtained from the pump correction characteristic map as shown in FIG. 7, using the lift operation amount of the blade 7.

Figure 8:
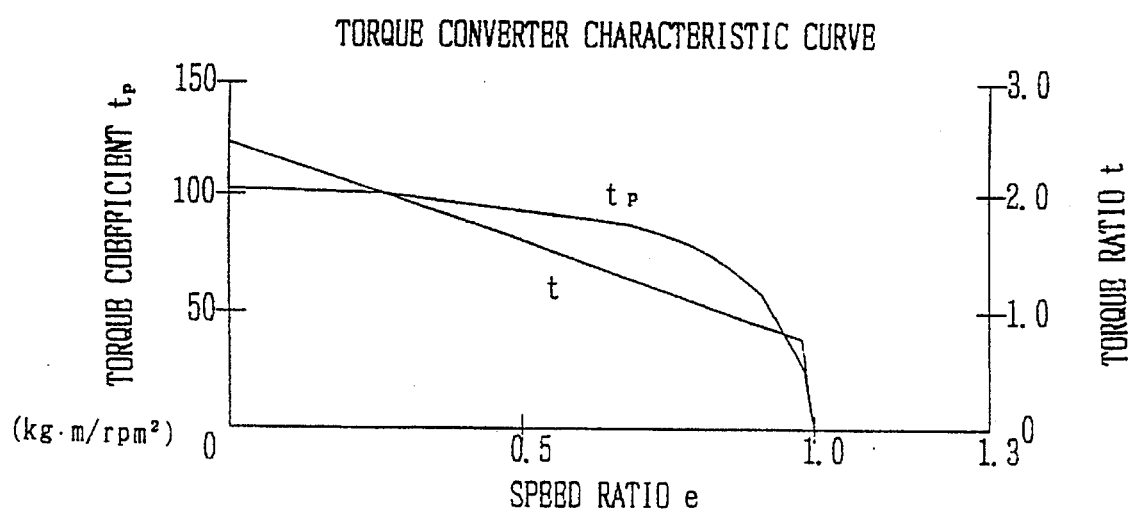
Figure 9:
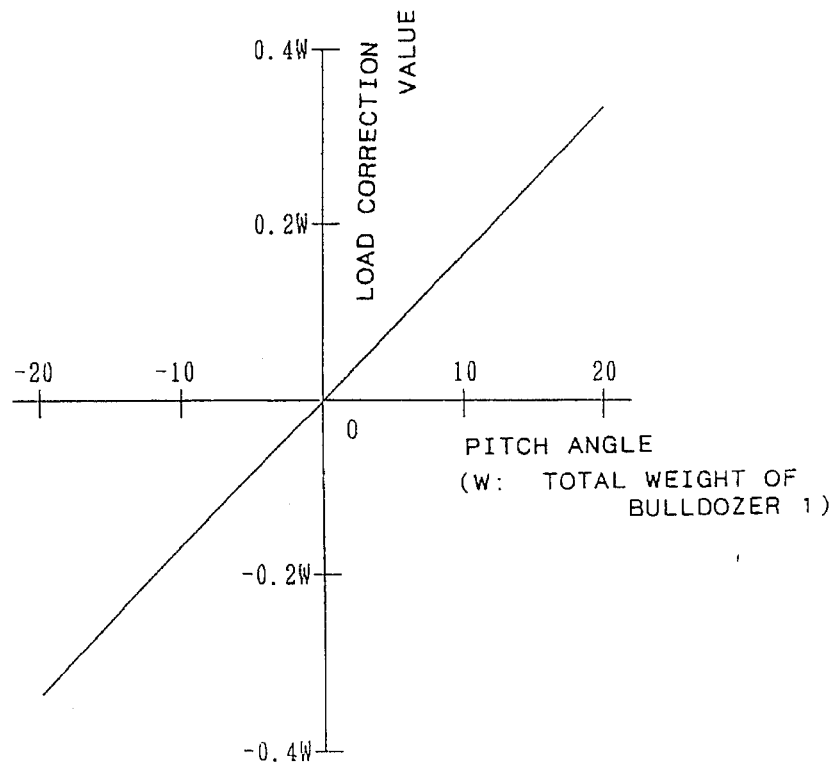

2. Where the torque convertor with a lock-up mechanism 33 is in the torque converting (TC) state:

A torque coefficient $t_p$ and torque ratio t are obtained from the curved torque convertor characteristic map as shown in FIG. 8, using the speed ratio e (=Nt/Ne) that is the ratio of the revolution speed Ne of the engine 30 to the revolution speed Nt of the output shaft of the torque convertor with a lock-up mechanism 33, and then torque convertor output torque Tc($=t_p \times (Ne/1000)_2 \times t$) is obtained. As in the case 1, the torque convertor output torque Tc is multiplied by the reduction ratio $k_{es}$ between the output shaft of the torque convertor with a lock-up mechanism 33 and the sprockets 6 and further multiplied by the diameter r of the sprocket 6, to obtain an actual tractive force $F_R(=Tc \times k_{es} \times r)$. Then, a load correction value which corresponds to the pitch angle of the vehicle body 2 and which has been obtained, in Step 4, from the pitch angle-load correction value characteristic map as shown in FIG. 9, is subtracted from the actual tractive force $F_R$, thereby obtaining an actual tractive force after correction F.

Step 12 to Step 16: It is judged whether the bulldozer 1 is in its running state or dozing operation in which light load occurs or dozing operation in which heavy load occurs. This judgment is carried out by judging which of the following conditions is satisfied by the actual tractive force after correction F. Note that "W" represents the total weight of the bulldozer 1.

1. When the following condition is satisfied, it is judged that the bulldozer 1 is in its running state:

Actual tractive force after correction $F \leq 0.3$ W

2. When the following condition is satisfied, it is judged that the bulldozer 1 is in dozing operation in which light load occurs:

0.3 W<Actual tractive force after correction F<0.5 W

3. When the following condition is satisfied, it is judged that the bulldozer 1 is in dozing operation in which heavy load occurs:

Actual tractive force after correction $F \leq 0.5$ W

After the judgment, one of the following processes will be carried out depending on the state of the bulldozer 1.

Figure 10:
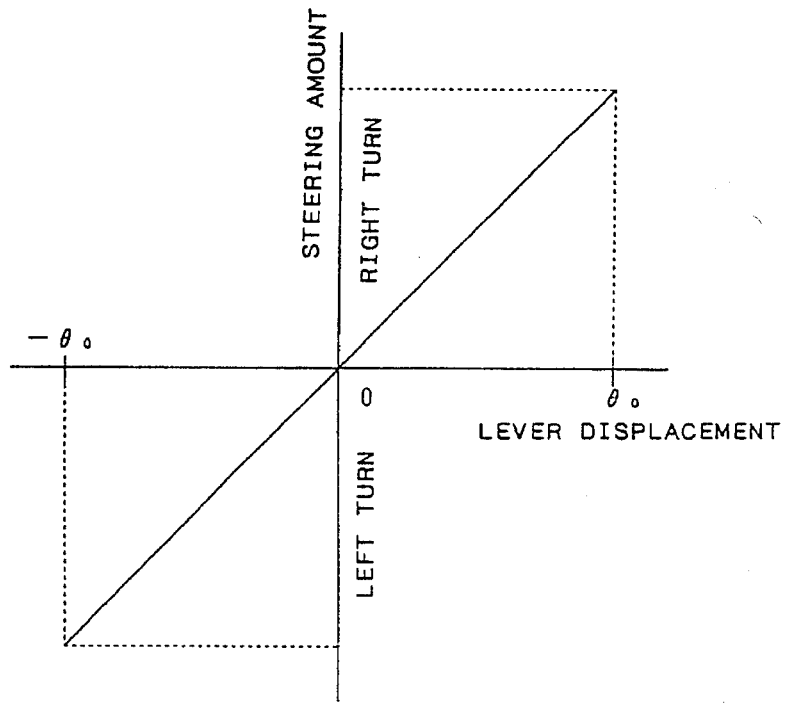

1. When the bulldozer 1 is in its running state:

From the steering control characteristic map shown in FIG. 10, a steering amount for actuating the steering clutches 35c and the steering brakes 35d by means of the steering controller 46 and the steering operation valves 47a to 47d is obtained, using the lever displacement data from the steering lever displacement sensor 42.

Figure 11:
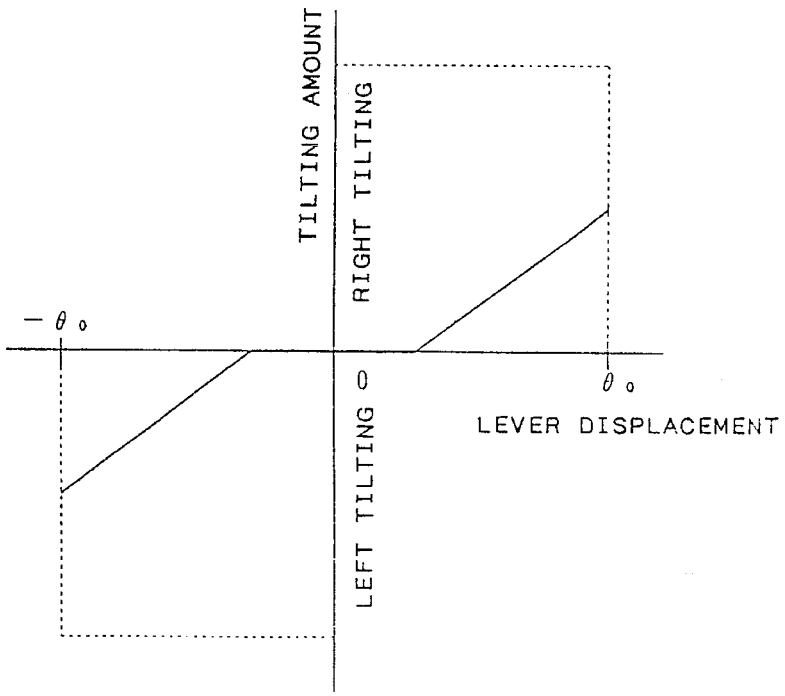

2. When the bulldozer is in dozing operation in which light load occurs:

Similar to the above case, a steering amount for actuating the steering clutches 35c and the steering brakes 35d is obtained from the steering control characteristic map of FIG. 10, using the lever displacement data from the steering lever displacement sensor 42. Further, a tilting amount for actuating the blade tilt cylinder 13 through the blade tilt cylinder controller 44 and the blade tilt operation valve 45 is obtained from the tilting control characteristic map for the blade 7 shown in FIG. 11, using the lever displacement data.

Figure 12:
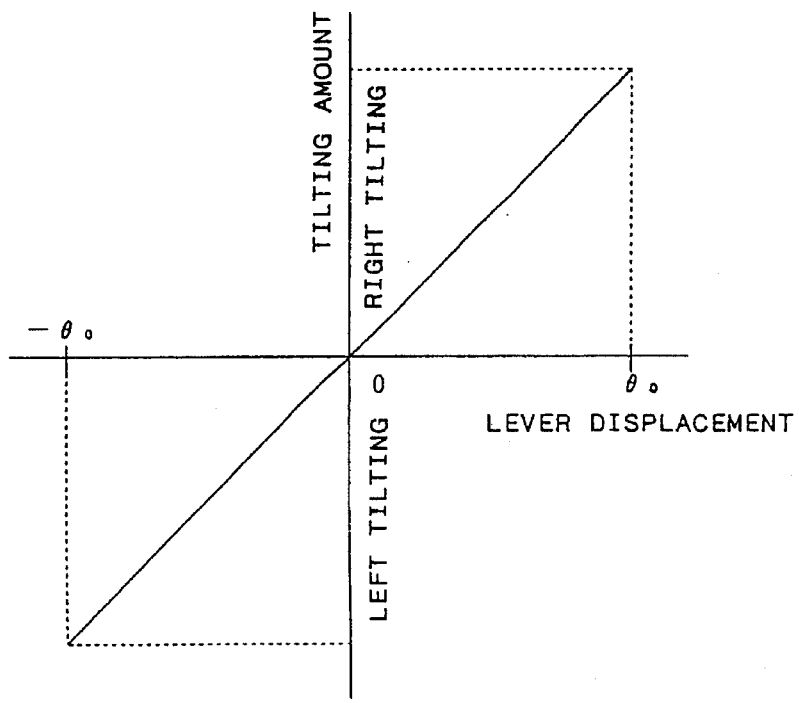

3. When the bulldozer is in dozing operation in which heavy load occurs:

Similar to the case 2, a tilting amount for actuating the blade tilt cylinder 13 is obtained from the tilting control characteristic map for the blade 7 shown in FIG. 12, using the lever displacement data from the steering lever displacement sensor If it is judged that the bulldozer 1 is in its running state, the pair of steering clutches 35c and the pair of steering brakes 35d are actuated based only on the obtained steering amount to cause a difference between the relative travel speeds of the right and left crawler belts 5 of the vehicle body 2, so that steering of the vehicle body 2 is controlled only by the relative speed difference. If it is judged that the bulldozer 1 is in dozing operation in which light load occurs, a difference is caused between the relative travel speeds of the right and left crawler belts 5 by actuating the steering clutches 35c and the steering brakes 35d based on the obtained steering amount. At the same time, the blade 7 is tilted laterally by actuating the blade tilt cylinder 13 based on the obtained tilting amount in order that work (e.g. digging) with the tilted blade 7 imposes offset load on the vehicle body 2. Steering of the vehicle body 2 is accordingly controlled by both the relative speed reference and the offset load. If it is judged that the bulldozer 1 is in dozing operation in which heavy load occurs, the blade 7 is tilted laterally by actuating the blade tilt cylinder 13 based on the obtained tilting amount in order that work (e.g. digging) with the tilted blade 7 imposes offset load on the vehicle body 2, so that steering of the vehicle body 2 is controlled only by the offset load.

When the automatic/manual steering control mode instruction from the automatic steering control mode selector button 20 instructs to select the manual steering control mode for dozing operation, steering of the vehicle body 2 is controlled by the conventional normal control method. Specifically, the pair of steering clutches 35c and the pair of steering brakes 35d are actuated, based on the lateral movement of the steering lever 15 operated by the operator, to cause a difference between the relative travel speeds of the right and left crawler belts 5 of the vehicle body 2, while the blade tilt cylinder 13 is actuated, based on the movement of the blade control lever 18 operated by the operator, to tilt the blade 7 laterally. In this normal control, unless the steering lever 15 and the blade control lever 18 are operated at the same time, steering of the vehicle body 2 cannot be controlled by the relative speed difference between the right and left crawler belts 5 of the vehicle body 2 and the offset load applied to the vehicle body 2 by laterally tilting the blade 7.

In the preferred embodiment just described, when detecting the actual tractive force, it is obtained by arithmetic operation. However, it could be detected in other ways. For example, a driving torque sensor for detecting the amount of driving torque for the sprockets 6 may be employed and the actual tractive force may be obtained from the amount of driving torque detected by the driving torque sensor. Alternatively, a bending stress sensor may be provided for detecting the amount of bending stress caused at the trunnions 10 by the straight frames 8, 9 for supporting the blade 7. The actual tractive force may be obtained from on the amount of bending stress detected by the bending stress sensor.

While the invention has been particularly described with the torque convertor with a lock-up mechanism 33 provided in the power transmission system, it is readily apparent that the invention can be applied to the cases where a torque convertor including no lock-up mechanism is used and where a direct transmission including no torque convertor is used. When such a direct transmission is used, the actual tractive force is calculated in the same way as described in the case where the torque convertor with a lock-up mechanism 33 is in its locked-up state.

In the foregoing embodiment, the steering lever 15 and the gear shift lever 16 are separately provided. However, they may be integrally formed as a steering/gear shift lever. In this case, the steering/gear shift lever can be operated rightwards and leftwards at the forward position, neutral position and reverse position of the gear shift lever 16.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering system for a bulldozer, comprising:
   (a) steering direction indicating means for indicating a lateral direction in which a vehicle body is to be steered;
   (b) dozing operation detecting means for judging by detection whether the bulldozer is in dozing operation; and
   (c) steering controlling means for controlling the vehicle body to be steered in the lateral direction indicated by the steering direction indicating means when the dozing operation detecting means judges that the bulldozer is in dozing operation, by tilting a blade in the indicated lateral direction in order to impose offset load on the vehicle body, and by causing a difference between relative travel speeds of right and left crawler belts attached to the vehicle body at least when light load occurs in the dozing operation.

2. The steering system for a bulldozer as claimed in claim 1, wherein the dozing operation detecting means judges whether the bulldozer is in dozing operation, based on an actual tractive force of the vehicle body.

3. The steering system for a bulldozer as claimed in claim 2, wherein the dozing operation detecting means judges that the bulldozer is in dozing operation, when the actual tractive force of the vehicle body is not less than a first specified value.

4. The steering system for a bulldozer as claimed in claim 1, wherein when the dozing operation detecting means judges whether the bulldozer is in dozing operation, it also judges whether heavy load occurs in the dozing operation, and wherein if the dozing operation detecting means judges that heavy load occurs in the dozing operation, the vehicle body is controlled to be steered in the lateral direction indicated by the steering direction indicating means, only by laterally tilting the blade in the indicated lateral direction by means of the steering controlling means in order to impose offset load on the vehicle body.

5. The steering system for a bulldozer as claimed in claim 4, wherein the dozing operation detecting means judges whether the bulldozer is in dozing operation and whether heavy load occurs in the dozing operation, based on an actual tractive force of the vehicle body.

6. The steering system for a bulldozer as claimed in claim 5, wherein the dozing operation detecting means judges that the bulldozer is in dozing operation, when the actual tractive force of the vehicle body is not less than a first specified value and judges that heavy load occurs in the dozing operation, when the actual tractive force of the vehicle body is not less than a second specified value which is greater than the first specified value.

7. The steering system for a bulldozer as claimed in claim 2 or 5, wherein the dozing operation detecting means is equipped with an engine revolution sensor for detecting the revolution speed of an engine and a torque convertor output shaft revolution sensor for detecting the revolution speed of an output shaft of a torque convertor, and wherein a speed ratio $e$ ($=Nt/Ne$), which is the ratio of the revolution speed $Nt$ of the output shaft of the torque convertor detected by the torque convertor output shaft revolution sensor to the revolution speed $Ne$ of the engine detected by the engine revolution sensor, is first obtained; then, torque convertor output torque is obtained from the torque convertor characteristic of the torque convertor, using the speed ratio $e$; and the torque convertor output torque is basically multiplied by the reduction ratio between the output shaft of the torque convertor and sprockets for actuating the crawler belts, whereby the actual tractive force of the vehicle body is obtained.

8. The steering system for a bulldozer as claimed in claim 2 or 5, wherein the dozing operation detecting means is equipped with an engine revolution sensor for detecting the revolution speed of an engine, in cases where a torque convertor with a lock-up mechanism is in a locked-up state or a direct transmission is employed, and wherein engine torque is first obtained from the engine torque characteristic of the engine, using the revolution speed of the engine detected by the engine revolution sensor; and then, the engine torque is basically multiplied by a reduction ratio between the engine and sprockets for actuating the crawler belts, whereby the actual tractive force of the vehicle body is obtained.

9. The steering system for a bulldozer as claimed in claim 2 or 5, wherein the dozing operation detecting means is equipped with a driving torque sensor for detecting the amount of driving torque for sprockets for actuating the crawler belts, and the actual tractive force of the vehicle body is obtained based on the driving torque amount detected by the driving torque sensor.

10. The steering system for a bulldozer as claimed in claims 7, wherein the dozing operation detecting means is further equipped with a pitch angle sensor for detecting the pitch angle of the vehicle body when it inclines in forward and backward directions, and the actual tractive force of the vehicle body is corrected based on the pitch angle detected by the pitch angle sensor.

11. The steering system for a bulldozer as claimed in claim 2 or 5, wherein the dozing operation detecting means is equipped with a bending stress sensor for detecting the amount of bending stress occurring at trunnions which are joints between straight frames for supporting the blade and the vehicle body, and the actual force of the vehicle body is obtained based on the amount of bending stress detected by the bending stress sensor.

12. The steering system for a bulldozer as claimed in claim 3, wherein the first specified value is 0.3 W.

13. The steering system for a bulldozer as claimed in claim 6, wherein the first specified value is 0.3 W and the second specified value is 0.5 W.

14. The steering system for a bulldozer as claimed in claim 8, wherein the dozing operation detecting means is further equipped with a pitch angle sensor for detecting the pitch angle of the vehicle body when it inclines in forward and backward directions, and the actual tractive force of the vehicle body is corrected based on the pitch angle detected by the pitch angle sensor.

15. The steering system for a bulldozer as claimed in claim 9, wherein the dozing operation detecting means is further equipped with a pitch angle sensor for detecting the pitch angle of the vehicle body when it inclines in forward and backward directions, and the actual tractive force of the vehicle body is corrected based on the pitch angle detected by the pitch angle sensor.

* * * * *